US008538682B1

(12) United States Patent
Vankatraman et al.

(10) Patent No.: US 8,538,682 B1
(45) Date of Patent: Sep. 17, 2013

(54) SYSTEMS AND METHODS FOR SATELLITE NAVIGATION USING LOCALLY GENERATED EPHEMERIS DATA

(75) Inventors: Sai Pradeep Vankatraman, Santa Clara, CA (US); Janne Jarvenpaa, Tampere, FL (US); Qinfang Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 924 days.

(21) Appl. No.: 12/429,544

(22) Filed: Apr. 24, 2009

(51) Int. Cl.
*G01C 21/00* (2006.01)
(52) U.S. Cl.
USPC ............................ 701/412; 701/408; 701/472
(58) Field of Classification Search
USPC .................. 701/200–226, 408, 412, 472, 489
See application file for complete search history.

(56) References Cited

U.S. PATENT DOCUMENTS

| 6,313,787 | B1 * | 11/2001 | King et al. | 342/357.42 |
| 7,679,550 | B2 * | 3/2010 | Garrison et al. | 342/357.29 |
| 7,839,330 | B2 * | 11/2010 | Garin et al. | 342/357.66 |
| 2002/0065587 | A1 * | 5/2002 | Syrjrinne et al. | 701/13 |
| 2003/0004640 | A1 * | 1/2003 | Vayanos | 701/213 |
| 2008/0270026 | A1 | 10/2008 | Han | |
| 2011/0012785 | A1 * | 1/2011 | Mattos | 342/357.66 |

OTHER PUBLICATIONS

SiRF INSTANTFIX II Technology Zhang, et al., SiRF Technology, Inc.
Hotstart Every Time, Mattod ST Microelectronics R&D Ltd. UK.

* cited by examiner

*Primary Examiner* — Adam Levine
(74) *Attorney, Agent, or Firm* — Bay Area Technology Law Group PC (57) ABSTRACT

This disclosure is directed to methods and systems for locally generating calculated ephemerides that may be used by a navigation device to calculate position information before a broadcast ephemeris from a given navigation satellite has been completely received or when the broadcast ephemeris from the satellite is not available. Generally, the invention includes the steps of calibrating the initial satellite velocity from the last available broadcast ephemeris, correcting the clock for a prediction time period, predicting the satellite position during the time period and formatting the predictions into a calculated ephemeris to be used by the receiver to determine position information.

28 Claims, 4 Drawing Sheets

SYSTEMS AND METHODS FOR SATELLITE NAVIGATION USING LOCALLY GENERATED EPHEMERIS DATA

FIELD OF THE PRESENT INVENTION

This disclosure relates generally to satellite navigation receivers and in particular to systems and methods for reducing the time necessary to provide navigational information by utilizing a locally generated ephemeris to supplement satellite transmissions.

BACKGROUND OF THE INVENTION

Satellite navigation systems allow electronic receivers to determine navigational information such as position (latitude, longitude, and altitude), velocity and time, also known as PVI information. One example of such a system is the United States Naystar Global Positioning System (GPS), which may include up to thirty-two or more functional navigation satellites. Other examples of satellite navigation systems include the Russian GLONASS system and the European Galileo system. Satellite navigation receivers, such as GPS receivers typically use GPS data from three or more orbiting satellites to determine navigation information. Only a portion of the satellites within a navigation system may be visible to a particular navigation receiver at a given time.

GPS satellites typically transmit GPS signals on two bands: the L1 band with a carrier frequency of 1575.42 MHz and the L2 band with a carrier frequency of 1227.60 MHz. Traditionally, only authorized users have been able to use data transmitted on the L2 band. In the future, civilian GPS signals may be transmitted on the L2 band and the L5 band (1176.45 MHz). Typically, low cost GPS receivers receive only on one of these bands. Some civilian GPS receivers may use clock data from the L2 band to refine GPS data carried in the L1 band. The following descriptions use the L1 band to describe exemplary embodiments; however, other embodiments may be implemented using one or more GPS bands or other global positioning signals.

GPS satellites transmit data using a form of spread spectrum coding known as code division multiple access (CDMA). Each satellite may be assigned a coarse acquisition (CA) code that resembles pseudo random noise and is typically unique to that satellite. Each satellite encodes data using the satellite's CA code and transmits encoded data on the L1 carrier frequency (i.e., data is spread using the CA code). Thus, all satellites are simultaneously transmitting data on a shared carrier frequency. In some embodiments, a ground-based pseudo-GPS satellite (i.e., a pseudo-lite) may transmit GPS data by using a CA code not used by any satellites or of a satellite that may be out of view of the GPS receiver. Once a GPS signal with a particular CA code is received and identified, the GPS receiver is said to have "acquired" the GPS satellite associated with that CA code. A GPS receiver may also "track" a GPS satellite by continuing to receive a GPS signal from a previously acquired GPS satellite.

The conventional approach to using GPS satellites for user positioning requires the receiver to download the navigation message from 4 or more visible satellites in order to determine an adequate PVI solution. The navigation message from each satellite contains the broadcast ephemeris, the ionospheric models, and UIC-GPS clock correction that are necessary for the user to compute the position of the satellites in the earth-centered earth-fixed (ECEF) coordinate system for a specified time.

The navigation message is formatted into flames. Each flame consists of 5 sub-frames that are 6 seconds each in duration. The broadcast ephemeris (including UIC-GPS clock correction) for each satellite is provided in sub-frames 1, 2 and 3, and the almanac and ionospheric models are provided in sub-frames 4 and 5. Consequently, the minimum time required to download the ephemeris data for a satellite is 18 to 36 seconds. The broadcast ephemeris is valid for a period of 4 hours starting from the time the satellite starts to broadcast the data.

Typically, after a GPS receiver acquires four or more GPS satellites, the GPS receiver may determine a PVI solution. If the GPS receiver can acquire more than four GPS satellites, the PVT solution may be made more accurate. Some GPS receivers may determine a PVT solution with less than four GPS satellites. Such a solution, however, may not be as accurate as a solution determined with four or more GPS satellites.

However, as one of skill in the art will appreciate, if the GPS receiver is turned on for the first time or after a few days, also known as a cold start, or after several hours from the last use, also known as a warm start, the receiver will not have the latest broadcast ephemeris from the navigation satellites. In this case the receiver has to wait until at least 4 satellites have been acquired and their broadcast ephemerides have been extracted before estimating the user position. This time period is generally known as the time to first fix (TTFF). As noted above, receiving ephemerides from the satellites necessarily introduces a latency of at least 30 seconds and up to several minutes before navigational determinations can be made. Moreover, under weak signal conditions, the signal to noise ratio of the transmission from one or more satellites may fall below the receiver's threshold to reliably decode the navigation message. Thus, the receiver may not be able to generate a position even after a period of minutes.

To improve TTFF and provide receiver operation when satellite reception is degraded, attempts have been made to supplement the ephemeris data available to the remote navigation device. In general, these methods use an external source of ephemeris data, independent of the satellite transmission, which is then delivered to the receiver.

For example, a first method is known as Assisted GPS or AGPS In AGPS, the navigation device maintains a wireless communication with the external source of the ephemeris data. Naturally, this method requires that the navigation device maintain a wireless communication link, such as over a cellular telephone network, to a server in order to receive ephemeris assistance on demand. Alternatively, a second method is known as extended ephemeris, wherein a server generates predicted pseudo-ephemeris data for one or more satellites having a validity of several days and formats the prediction into a data file. This file is periodically transmitted to the navigation receiver over a wireless medium, such as the cellular telephone network, or via a wired connection, such as through a personal computer linked to the Internet.

Although these methods can be used to facilitate navigational determinations when some portion of broadcast ephemeris data is unavailable to the receiver, they require an additional source of ephemeris data and either a continuous or intermittent wireless link or the periodic connection of the receiver to a network to deliver the ephemeris data. Accordingly, there is a need for systems and methods that reduce the TTFF without requiring an external source of ephemeris data. Similarly, there is a need for systems and methods that can provide position information when signal reception from the navigational satellites has been compromised.

SUMMARY OF THE INVENTION

In accordance with the above objects and those that will be mentioned and will become apparent below, this disclosure is directed to a method for determining a position of a device including a GPS receiver comprising the steps of receiving a broadcast ephemeris having a validity period from a navigation satellite, calibrating an initial velocity for the satellite at a point during the validity period, predicting a satellite position at a first time subsequent to the end of the validity period, generating a calculated ephemeris from the predicted satellite position, and determining the position of the device using the calculated ephemeris.

In one embodiment, the step of calibrating the initial velocity for the satellite comprises performing a non-linear estimation routine on satellite positions determined from the broadcast ephemeris. The step of calibrating the initial velocity for the satellite comprises the steps of determining satellite positions in the validity period from the broadcast ephemeris, calculating an initial vector at the end of the validity period based upon the determined satellite positions, and minimizing an objective function of the determined satellite positions and predicted satellite positions. Preferably, minimizing an objective function comprises minimizing the vector sum of a squared radial distance error between determined satellite positions and predicted satellite positions to estimate a new initial vector. More preferably, the step of minimizing the vector sum of a squared radial distance error between determined satellite positions and predicted satellite positions comprises applying a Levenberg-Marquardt algorithm.

In another embodiment, the step of predicting a satellite position at a first time subsequent to the end of the validity period comprises numerically integrating differential equations describing satellite motion. Preferably, the differential equations comprise three velocity equations and three acceleration equations. More preferably, the numerical integration is a Runge-Kutta method.

Another aspect of this disclosure includes the step of calculating clock correction coefficients and wherein the step of generating the calculated ephemeris comprises generating the calculated ephemeris from the predicted satellite position and the calculated clock correction coefficients.

Another embodiment is a method further comprising the step of predicting a satellite position at a second time subsequent to the end of the validity period; wherein the step of generating the calculated ephemeris from the predicted satellite position and the calculated clock correction coefficients comprises interpolating a satellite position between the first time and the second time. Preferably, the step of interpolating a satellite position between the first time and the second time comprises a Hermite interpolation.

In yet another embodiment, the step of generating the calculated ephemeris from the predicted satellite position and the calculated clock correction coefficients comprises estimating a set of osculating elements that have a form corresponding to the broadcast ephemeris.

Alternatively, the step of generating the calculated ephemeris from the predicted satellite position and the calculated clock correction coefficients comprises converting the predicted satellite position into a reduced set of Keplerian orbital elements, preferably in a form corresponding to the broadcast ephemeris.

This disclosure is also directed to a GPS receiver capable of determining a position based upon a received broadcast ephemeris from a navigation satellite, wherein the GPS receiver is configured to provide an initial velocity calibration for the satellite at a point during the validity period, predict a satellite position at a first time subsequent to the end of the validity period, generate a calculated ephemeris from the predicted satellite position; and determine the position of the receiver using the calculated ephemeris.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

This disclosure involves the prediction and propagation of GPS satellite positions, velocities and clock corrections for 3 days or more using software that resides on client-side on the navigation device to locally generate calculated ephemerides. If the receiver is unable to download current broadcast ephemeris due to poor signal conditions, the calculated ephemeris can be used instead. Since the calculated ephemeris is generated locally, the navigation devices do not require network connectivity. Although the calculated ephemeris loses some accuracy in satellite position and clock correction, the embodiments disclosed provide significant reductions in TTFF. Further, the accuracy is sufficient to permit acceptable user navigation over the prediction period and meets or exceeds current industry benchmarks. Using the latest broadcast ephemeris, the initial velocity is calibrated by performing a prediction routine carried out backwards starting from the end of the broadcast ephemeris' valid time period. Next, satellite position and velocity are propagated forward into the future through numerical integration of the satellite's equation of motions. With the techniques disclosed in this specification, the TTFF can be reduced to a few seconds.

At the outset, it is to be understood that this disclosure is not limited to particularly exemplified materials, methods or structures as such may, of course, vary. Thus, although a number of materials and methods similar or equivalent to those described herein can be used in the practice of embodiments of this disclosure, the preferred materials and methods are described herein.

It is also to be understood that the terminology used herein is for the purpose of describing particular embodiments of this disclosure only and is not intended to be limiting.

Unless defined otherwise, all technical and scientific terms used herein have the same meaning as commonly understood by one having ordinary skill in the art to which the disclosure pertains.

As used herein, the terms "navigation device," "GPS receiver," and "receiver" are used interchangeably to refer to portable devices capable of receiving data from navigation satellites and determine position, velocity and/or time information form that data.

As used herein, the term "navigation message" refers to the data stream broadcast by a navigation satellite and includes the broadcast ephemeris, the ionospheric models, and clock correction coefficients.

As used herein, the term "calculated ephemeris" refers to data generated locally by a navigation device and may include one or more types of data including predicted satellite positions, predicted orbital vectors, predicted ionospheric models and predicted clock correction coefficients. Furthermore, this data may be formatted in a syntax corresponding to a conventional broadcast ephemeris or may be formatted in any another suitable manner for use by the navigation device.

Further, all publications, patents and patent applications cited herein, whether supra or infra, are hereby incorporated by reference in their entirety.

Finally, as used in this specification and the appended claims, the singular forms "a," "an" and "the" include plural referents unless the content clearly dictates otherwise.

This disclosure is directed to methods and systems for locally generating calculated ephemerides that may be used by a navigation device to determine position information before a broadcast ephemeris from a given navigation satellite has been completely received or when the broadcast ephemeris from the satellite is not available. Generally, the embodiments include the steps of calibrating the initial satellite velocity from the last available broadcast ephemeris, correcting the clock for a prediction time period, predicting the satellite position during the time period and formatting the predictions into a calculated ephemeris to be used by the receiver to determine position information.

Figure 1:
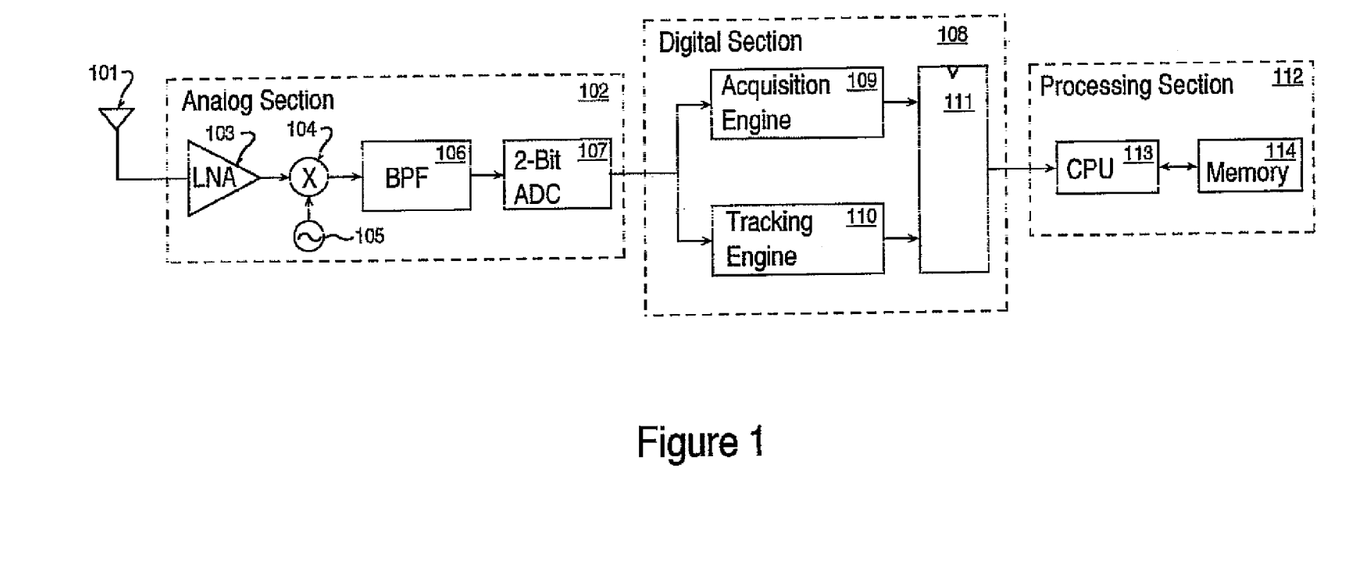
FIG. 1 is a conceptual diagram of a GPS receiver, suitable for practicing an embodiment of the invention.

FIG. 1 is a schematic representation of the general sections of a conventional GPS receiver 100. An antenna 101 receives the RF signals from the GPS satellites. The RF signals are then amplified, down converted, filtered, and converted into a digital signal by the analog section 102. Specifically, a low-noise amplifier 103 amplifies the weak RF signals. A mixer 104 and local oscillator 105 down converts the amplified RF signals to a lower intermediate frequency (IF) signal. A band pass filter 106 is used to filter out interference. The filtered IF signal is then converted into an equivalent digital IF signal by means of a 1 or 2-bit analog-to-digital converter (ADC) 107. The digital IF signal is then input to a digital section 108. The acquisition engine 109 and tracking engine 110 of the digital section 108 process the digital IF signal to extract the navigation message, including the broadcast ephemeris, which is then input to the processing section 112 by means of register 111. The central processing unit (CPU) 113 analyzes the navigation message according to programming instructions stored in the memory 114 and produces the final location information.

As indicated above, locally-generating a calculated ephemeris according to presently preferred embodiments first involves an initial satellite velocity calibration. For a given satellite, the latest broadcast ephemeris that has been received by GPS receiver 100 has an associated time of ephemeris (TOE) $T_i$. In one embodiment of the disclosure, the broadcast ephemeris has a validity period of 4 hours which corresponds to a range $T_c \subset [T_i-7200, T_i+7200]$, where time is expressed in seconds. As will be recognized, other time ranges and periods can be used as desired. Generation of a calculated ephemeris involves predicting the satellite's position every T seconds starting at the end of this range, for a desired prediction period.

Figure 2:
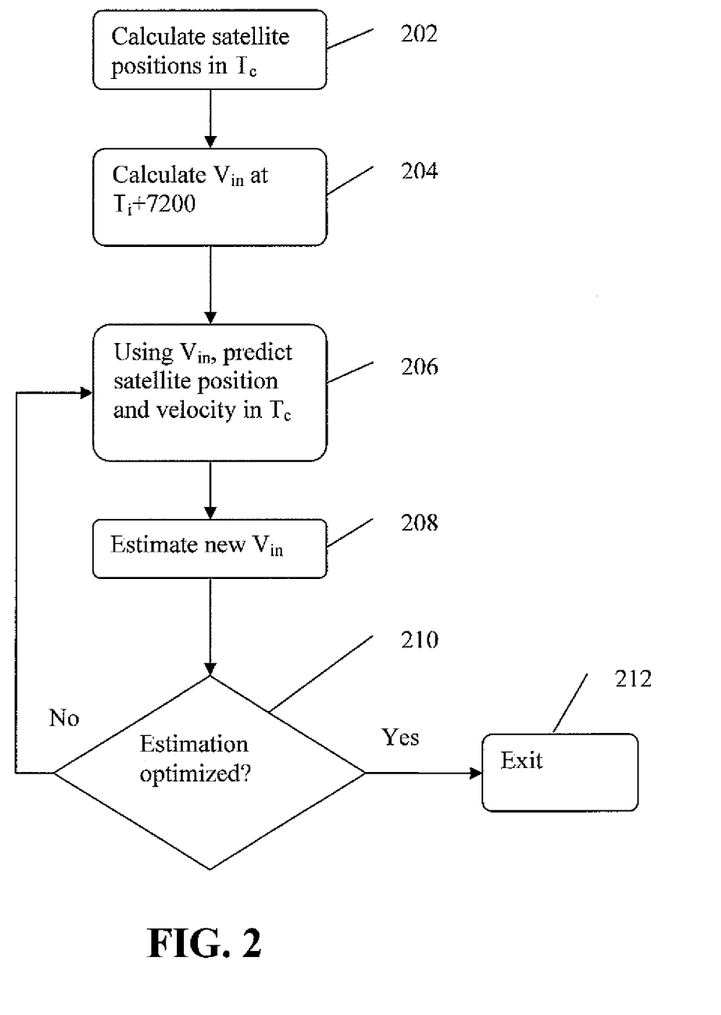
FIG. 2 is a flow chart showing the steps involved in performing an initial velocity calibration, according to an embodiment of the invention.

FIG. 2 illustrates the steps involved in the initial velocity calibration of a satellite. A rough estimate of the satellite's position and velocity can be calculated at time Ti+7200 using known closed form equations, such as disclosed by Remondi, B W, "Computing Satellite Velocity using the Broadcast Ephemeris", GPS Solutions, Springer Berlin/Heidelberg, pp 181-183, Volume 8, Number 3, 2004. In step 202, reference or true satellite positions in earth centered inertial (ECI) coordinates are calculated every seconds backward in $T_c$ starting at $T_i+7200$ and ending at $T_i-7200$. Since the broadcast ephemeris is valid for a period of 4 hours, the period used can be up to 14,400 seconds.

In step 204, the calculated satellite positions are used to determine an initial velocity at $T_i+7200$. Preferably, the closed form equation discussed above are used to determine $V_{in}$, although a numerical differentiation approach to calculate the derivative of position can also be used. Since the accuracy of this velocity vector is insufficient for accurate satellite predictions, it is refined in the following steps 1n step 206, $V_{in}$ is used as the initial state in a prediction routine that estimates the satellite position every T seconds backwards in $T_c$, starting at time Ti+7200. In step 208, a new $V_{in}$ is estimated by the prediction routine from the predicted and reference positions of the satellite. Finally, in step 210, the prediction routine determines whether the estimation has been optimized. If so, the prediction routine exits in step 212 and the value of $V_{in}$ is used in the subsequent generation of the calculated ephemeris. Otherwise, the new estimate of $V_{in}$ is passed back to step 206 and the prediction routine is run again.

In the noted embodiment, the initial velocity calibration is performed at the end of the validity period. However, as will be appreciated, the initial velocity calibration can be performed at any point during the validity period.

In a preferred embodiment, the prediction routine is an implementation of the known Levenberg Marquardt (LM) algorithm $V_{in}$ is optimized by minimizing the objective function of the vector sum of the squared radial distance error between true satellite positions from the broadcast ephemeris and predicted satellite positions in $T_c$.

In other embodiments, other known non-linear estimation algorithms can be used for the prediction routine. Similarly, other suitable objective functions can be used to estimate $V_{in}$, including without limitation squared three dimensional error, weighted radial, along track or cross track error, and weighted sum of radial and three dimensional errors. Further, although the preferred embodiment involves a batch processing estimation algorithm that attempts to find the optimum initial velocity vector given a set of predictions, a sequential or recursive estimation procedure such as a Sequential Least Squares or a Kalman Filter may also be used as is known in the art.

In another aspect of the disclosure, if the receiver was able to download two or more consecutive sets of broadcast ephemeris for a particular satellite, the length of the calibration window can be extended accordingly to improve the velocity estimate at the start of predictions. For example, if two consecutive sets of broadcast ephemeris were available, the calibration window length would be up to 28,800 seconds.

Following initial satellite velocity calibration using the prediction routine, the local generation of a calculated ephemeris requires determination of appropriate clock correction coefficients. Each broadcast ephemeris set includes the clock correction coefficients that are used by the GPS receiver to correct the satellite clock errors. This enables the receiver to get an accurate representation of the GPS system time at the transmission instant for the signal it has received. These are provided in subframe 1 of the broadcast ephemeris in words 8-10.

Generally, clock correction is formatted as a polynomial equation wherein $af_0$, $af_1$ and $af_2$ are the polynomial coefficients for the satellite clock correction and represent the bias, drift and drift rate of the clock error, respectively. Therefore, the satellite clock correction term can be approximated by the polynomial $$\Delta t_{sv} = af_0 + af_1(t-t_{oc}) + af_2(t-t_{oc})^2$$

where t is the GPS system time needed to solve for user position and $t_{oc}$ is the reference time in the broadcast ephemeris.

The stochastic nature of the clock correction bias makes it difficult to predict future values of clock correction. Thus, if only one past broadcast ephemeris is available for generation of the calculated ephemeris, the $af_0$, $af_1$ and $af_2$ polynomial coefficients from that set are used in the calculated ephemeris generated for all days of prediction. If more past broadcast ephemeris sets are available, curve fit routines can be used to extrapolate the clock correction curve to predict the clock bias. Further details regarding suitable methods for refreshing the clock predictions when one or more sets of broadcast ephemerides are available are given in commonly-owned, co-pending patent application U.S. Ser. No. 12/247,817, filed Oct. 8, 2008, which is hereby incorporated by reference in its entirety.

The next step in the generation of calculated ephemeris involves satellite position prediction. At an initial time, $t_i$, the position and velocity vectors of the satellite are available. In one aspect of the disclosure, the orbital position of the satellite is predicted at time $t_f$ either in the past or the future. At all times in the interval $[t_i, t_f]$, the forces affecting satellite motion, such as gravity due to earth, sun and moon, and solar radiation pressure, can be computed using known techniques. The satellite accelerations are derived from these forces at each time instant as summarized below.

The first force is the gravity of the earth. Because the earth is not perfectly spherical and the mass distribution is uneven, the total acceleration is given by the sum of accelerations due to ideal two-body motion and acceleration due to the non-spherical nature. The non-spherical acceleration depends on the geocentric latitude and longitude at a specific time and can be derived from the gravitational potential which is the sum of zonal, sectorial and tesseral harmonic terms with known constant coefficients given in the EGM-96 model. The complete model consists of a 360×360 gravity field.

For GPS satellites, unless centimeter level accuracy is required, it is not necessary to use the complete EGM-96 model in computing the gravitational acceleration since it is computationally expensive. In a currently preferred embodiment, a 7×7 or lower order subset can be used to achieve sufficient accuracy using conventional processors. As desired, more detailed gravitational models can be used.

The next perturbing force considered is the gravity of the sun and moon. As will be appreciated, gravitational attraction due to sun and moon disturbs the orbit of the satellite and contributes to the acceleration. The effect of the moon is higher since it is much closer to the satellite than the sun. To compute the accelerations due to sun and moon, the solar and lunar positions at the time of computation are needed.

Computing the position of the sun every time it is required during the 3-day predictions can add a significant computational load to the navigation device's processor. Accordingly, a preferred embodiment involves computing the sun's position once at the start of velocity calibration and using this position throughout the 3-day prediction process. Although this approximation leads to a small loss in accuracy in the predicted positions, it allows for faster processing time. Given the trade-off between the accuracy and computational demands corresponding to the frequency at which the sun's position is calculated, it is desirable to set the frequency of computing the sun's position during the prediction period as a configurable parameter.

Another perturbing force is the solar radiation pressure (SRP). The incident radiation from the sun causes a disturbing force on the satellite. This force depends on the incident SRP, area of the satellite exposed to the sun, reflectivity of the satellite and the mass of the satellite. Since these parameters vary during the course of orbital motion, several models are available to estimate the accelerations due to SRP at a given point in the orbit. These include the ROCK models, the T20 and T30 models and JPL models. Each of these models features a scaling factor in the X and Z dimensions of the acceleration in the satellite body-fixed frame and a Y-bias term.

As will be appreciated by one of skill in the art, several known options are available to deal with these slowly varying parameters. For example, the SRP scaling factor and Y-bias can be updated in software if changes in SRP values indicate a need to refresh the values. Alternately, the SRP parameters can be estimated during the calibration stage along with the initial velocity. In terms of the effect of different disturbing forces on the GPS orbit, the SRP is not as significant as the gravitational forces and a slight mismatch in the scaling factor or Y-bias does not lead to large errors Conventional error correcting techniques such as map matching are adequate to compensate for these deficiencies.

Therefore, an initial vector of position and velocity along with accelerations computed at intermediate time points are available, allowing the position and velocity of the satellite at $t_f$ to be predicted. In a preferred embodiment, a system of 6 differential equations is formed:

$$\dot{\bar{X}} = \begin{bmatrix} \dot{\bar{r}} \\ \ddot{\bar{r}} \end{bmatrix}$$

where the acceleration vector $$\ddot{\bar{r}} = \frac{\mu}{r^2}\frac{\bar{r}}{r} + \bar{a}_p$$

is the sum of two-body unperturbed acceleration, $$-\frac{\mu}{r^2}\frac{\bar{r}}{r}$$

and the disturbing accelerations are lumped as $\bar{a}_p$ and $\dot{\bar{r}}$ is the velocity vector. The first set of three equations define the satellite velocity in 3D as the derivative of satellite position and the next set of three equations define the satellite acceleration as the derivative of velocity. At each time instant, the slope is therefore a set of velocities in 3D and a set of accelerations in 3D.

Figure 3:
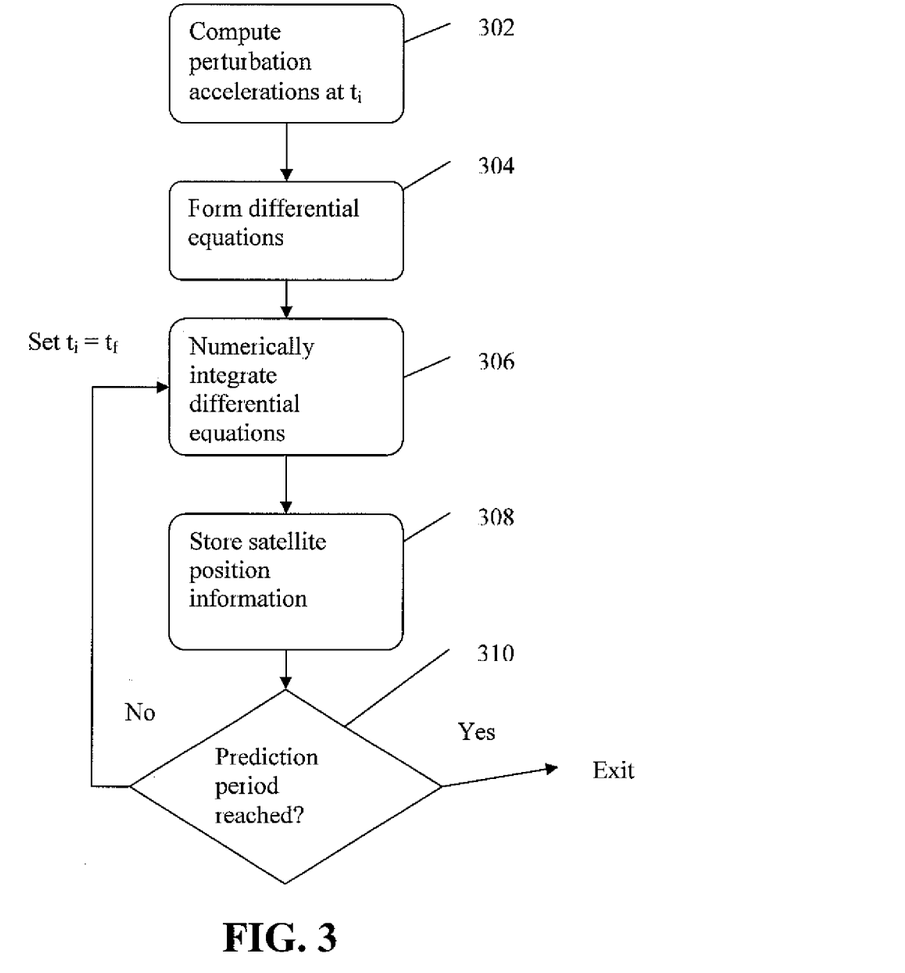
FIG. 3 is a flow chart showing the steps involved in predicting satellite velocity and position, according to an embodiment of the invention.

As depicted in FIG. 3, the satellite position is predicted in the following manner. In step 302, compute the perturbation accelerations at time $t_i$ in ECI. From the accelerations, a system of 6 first order differential equations is formed in step 304. In step 306, the equations are numerically integrated by one step to obtain position and velocity at $t=t_f$. The satellite position information corresponding to $t_f$ is stored in step 308. Finally, step 310 determines whether the end of the desired prediction period has been reached. If so, the routine exits and if not, $t_i$ is set to $t_f$ and the routine returns to step 306.

In a preferred embodiment of this disclosure, the differential equations are solved using a suitable numerical integration technique known to those of skill in the art, such as the Runge-Kutta-Fehlberg (RKF) method described below.

In a first example, if the slope of a function is represented by a differential equation of the form $$\frac{dy}{dt} = f(t, y),$$

then the value of the function at time $t_{i+1}$ can be obtained as $y_{i+1}=y_i+f(t_i, y_i)h$ where $h=t_{i+1}-t_i$ is the time step. However, since the slope was calculated at a single time instant it may represent a poor estimate of the actual slope if the velocity is changing fast. Preferred embodiments of the disclosure use available slopes at many intermediate points to better estimate the final value. The Runge-Kutta methods are examples of such techniques. Thus, an improved estimate of the slope can be obtained by linearly combining multiple intermediate slopes such that $\phi=a_1k_1+a_2k_2+\ldots a_nk_n$, where the a's are constants and the k's are intermediate slopes.

As will be recognized, there are several types of Runge-Kutta methods based on the number of terms used for the slope. The k's are recurrence relationships in that the $k_n$ appears in the equation for $k_{n+1}$. For example, a third order Runge-Kutta method is given by $$y_{i+1} = y_i + \frac{1}{6}(k_1 + 4k_2 + k_3)h$$

where $$k_1 = f(t_i, y_i)$$

$$k_2 = f\left(t_i + \frac{1}{2}h, y_i + \frac{1}{2}k_1 h\right)$$

$$k_3 = f(t_i + h, y_i - k_1 h + 2k_2 h)$$

In a preferred embodiment, the numerical integration used is an RKF method, which is an advanced version that uses 2 types of RK to additionally estimate a truncation error and to use a variable step size. In the case of the RKF78, an RK of order 7 and an RK of order 8 are both required. A new step size is estimated using the defined tolerance level and estimated local truncation error.

As discussed above, the output of the satellite position prediction stage at step 308 is a set of orbital vectors for each available satellite every T seconds from the beginning of prediction. The predicted orbital vector at a given time includes the satellite position and velocity vectors in the earth centered, earth fixed (ECU) coordinate system and the corresponding clock correction parameters. T represents the interval used in the numerical integration process and in a preferred embodiment is set at 900 seconds. However, as will be recognized, the interval can be set at smaller or larger values depending on the constraints posed by the processing unit. A high speed processor can accommodate a smaller step size without impeding run time whereas a lower speed processor may make it desirable to perform the predictions at a lower frequency.

Conventional GPS navigation devices in tracking mode update the user position at a fixed rate, typically about 1 Hz. This requires that the user position be calculated once per second and in turn requires that the visible satellite positions are available at the same rate. A difference in the rate at which satellite position prediction calculates satellite orbital vectors and the rate at which user position is updated can make it necessary to process the predicted orbital vectors further so that the satellite positions and clock correction terms are synchronously available to the navigation device. Preferably, the final format of the satellite position predictions is also tailored to design factors in the receiver hardware and software including available storage, memory, processing power, software reuse, software complexity and development time. One of skill in the art will recognize that the post-processing of the satellite position predictions can be done in several ways that involve a tradeoff between accuracy, processor requirements and complexity.

In one embodiment, a first exemplary post-processing technique for converting satellite position prediction data to calculated ephemeris in a form suitable for use by the receiver is satellite position interpolation. Interpolation is a means for the receiver to calculate satellite positions at intermediate time points given predicted satellite positions at T sec intervals. Specifically, given the satellite position and velocity vectors at time $t_i$ and $t_{i+1}$, the position at an intermediate time $t_{int}$ can be calculated when the satellite trajectory in the interval $(t_i, t_{i+1})$ is approximated by an interpolating polynomial. As one of skill in the art will recognize, there are several methods of interpolation that can be used, including without limitation Lagrange polynomial interpolation, Newton's divided difference interpolation, Spline interpolation and Hermite interpolation.

In a preferred embodiment, cubic Hermite spline interpolation is used to interpolate the satellite positions at the endpoints using the satellite velocities at the endpoints as known derivatives. Interpolation can be carried out in the ECEF coordinate system or the inertial system. In each interval, separate interpolation is carried out in each of the X, Y and Z dimensions. One suitable implementation of the cubic Hermite interpolation scheme is given below $$p(t)=h_{00}(t)p_0+h_{01}(t)p_1+h_{10}(t)hv_0+h_{11}(t)hv_1$$

where
$p_0$ is the satellite position along the $k^{th}$ ECEF coordinate axes at time $t_0$
$p_1$ is the satellite position along the $k^{th}$ ECEF coordinate axes at time $t_1$
$v_0$ is the satellite velocity along the $k^{th}$ ECEF coordinate axes at time $t_0$
$v_1$ is the satellite velocity along the $k^{th}$ ECEF coordinate axes at time $t_1$ $$h_{00}(t)=2t^3-3t^2+1=(1+2t)(1-t)^2$$

$$h_{01}(t)=-2t^3+3t^2=t^2(3-2t)$$

$$h_{10}(t)=t^3-2t^2+t=t(1-t)^2$$

$$h_{11}(t)=t^3-t^2=t^2(t-1)$$

and $$h=t_{j+1}-t_i$$

$$t=(t_{int}-t_i)/h$$

Thus, the interpolating cubic Hermite polynomial is defined as a linear combination of four Hermite basis functions. This results in a unique third order polynomial specified by the data and the tangents at the endpoints.

In one aspect of this disclosure, if the satellite position is desired at a specified time $t_{int}$, the satellite position and velocity vectors at neighboring points $t_i$ and $t_{i+1}$ can be used to construct the cubic Hermite basis functions and the position at $t_{int}$ is then obtained using the above equations.

An advantage of using interpolation with orbital prediction is that the construction of the basis functions at a specified time and evaluation of the cubic polynomial is a simple processor task. Further, a batch of satellite predictions is not necessary to determine the position at a specified time since only the two closest neighboring sample points are required for interpolation. This provides the flexibility of predicting just a few steps ahead before use. In a further aspect, variable step sizes can be used for prediction based on the satellite's visibility at the user location.

As will be recognized, the accuracy of the interpolation method depends on the time step-size used in the prediction stage. A prediction interval of 900 seconds leads to relatively larger errors in the interpolated satellite position than a smaller step-size such as 300 seconds or 600 seconds. However, a reduction in the prediction step-size from 900 seconds to 300 seconds leads to a threefold increase in the processing time and a corresponding increase in storage requirement. One of skill in the art can adjust the step-size to accommodate the available hardware and software and the desired accuracy.

The use of interpolation can also require changes to the navigation software because typical GPS receivers expect satellite position information in the broadcast ephemeris ICD200 standardized format.

In another aspect of this embodiment, interpolation does not require the prediction stage to perform 3-5 days of calculations at once. Instead, predictions can be carried out up to a desired point in time at a specified prediction step size. Then, for the satellites deemed visible or expected to become visible at the particular user location, a smaller prediction step size can be used to ensure high accuracy. For satellites that are not visible, a step size of 900 seconds or larger may be used to help reduce processor load and improve performance.

In another embodiment of the disclosure, a second example of a suitable post-processing technique is satellite position to synthetic ephemeris conversion. This embodiment is directed to formatting the calculated ephemeris prediction data so that it is compatible with the ICD200 standard.

As discussed above, the GPS satellite orbit is modeled as a modified elliptical orbit where the ideal two-body Kepler orbit is perturbed by several factors not limited to non-spherical earth gravitational harmonics, solar radiation pressure, lunar and solar gravitation. The satellite position in the modified Keplerian orbit is known to be a function of the parameters listed in Table 1.

TABLE 1

| Parameter/unit | Definition |
|---|---|
| $(\alpha)^{1/2}/m^{1/2}$ | Square-root of semi major axis |
| e/unitless | Orbit eccentricity |
| $i_0$/radians | Inclination angle at reference time |
| $M_0$/radians | Mean anomaly at reference time |
| $\Omega_0$/radians | Longitude of ascending node of orbit plane at reference time |
| $\dot{\Omega}$/radian/s | Rate of right ascension |
| $\omega$/radians | Argument of perigee |
| idot/radians/s | Rate of inclination |
| $\Delta n$/radians/s | Mean motion difference from computed value |
| $C_{ic}$/radians | Amplitude of cosine harmonic correction to inclination |
| $C_{is}$/radians | Amplitude of sine harmonic correction to inclination |
| $C_{rc}$/meters | Amplitude of cosine harmonic correction to orbit radius |
| $C_{rs}$/meters | Amplitude of sine harmonic correction to orbit radius |
| $C_{uc}$/radians | Amplitude of cosine harmonic correction to argument of latitude |
| $C_{us}$/radians | Amplitude of sine harmonic correction to argument of latitude |

These parameters correspond to the set of osculating elements that are provided in the broadcast ephemeris message ICD200. To arrive at a best fit to the satellite orbit, the parameters of the model have to be changed periodically. The broadcast ephemeris set is updated every 2 hours by the control segment, when the normal fit interval of 4 hours is used. Longer fit intervals are also possible in the ICD200 scheme. Each broadcast ephemeris set is normally valid for a 4 hour period so that there is a 2 hour overlap with both preceding and succeeding ephemeris sets. Beyond that, the GPS receiver needs a more current broadcast ephemeris in order to compute accurate satellite positions.

By using a least squares fit, the predicted satellite positions can be formed in a set of osculating elements at 4 hour intervals. The calculated synthetic ephemeris corresponding to this set of osculating elements replicates the structure of the broadcast ephemeris. The software can then use the synthetic ephemeris in lieu of the broadcast ephemeris.

The sequence of satellite positions from the prediction stage are spaced T seconds apart. For the sake of convenience, it is assumed in subsequent discussions that is set at 900 seconds. The parameter estimation can be carried out as an estimation procedure that fits a parameter set to 4 hours of predicted satellite positions. The time of ephemeris (TOE) is at the center of the 4 hour period representing the epoch when the true orbit and the predicted orbit osculate. This results in a set of osculating elements that when converted to satellite positions provide accurate orbital location at the center epoch and a gradually degrading accuracy at times away from the epoch.

The estimation process can also be performed in a way that the root mean square (RMS) error in the orbital locations over the fit interval is minimized. This kind of method typically does not minimize the error in the center of the fit interval. This estimation process is repeated every 4 hours such that there are 6 osculating element sets in a day. The model equations that describe the conversion from a set of ephemeris parameters to satellite positions in ECEF coordinates are typically implemented in the receiver and are used during the navigation process. The estimation procedure used in the algorithm discussed here aims at performing the reverse operation of going from known satellite positions to a set of ephemeris parameters. This falls under the broad category of curve-fitting minimization problems where a generally nonlinear function is minimized over a space of several parameters of the function. Preferably, the known Levenberg-Marquardt minimization procedure is used.

Nonlinear minimization algorithms, such as Levenberg-Marquardt minimization algorithms, are susceptible to the behavior of the minimization problem between the initialization point and the target minimum point. Higher nonlinearity between the two points slows down the convergence of the minimization algorithm and can make the algorithm to converge to a local minimum instead of the target minimum. In order to improve the estimation results, either the initialization point or the way the estimation algorithm steps toward the target can be adjusted.

For example, it is desirable to ensure that the generated calculated ephemeris corresponds to expected values. If estimation results do not fall within the acceptable limits, the Levenberg-Marquardt minimization algorithm can be run again with the same input data but using a different step size Different step sizes can be tried until the range of typical step sizes is covered or the estimation result is acceptable. One possible way of choosing different step sizes is to begin with the one that typically gives the best estimation results and then gradually pull away from the initial step size by choosing smaller and larger step sizes in alternating fashion. If all the different step sizes result in non-typical output quality, the best of the outputs can still be accepted, if the deviation from the typical output quality is moderate. It is also possible to run the minimization algorithm with different initialization values until the estimation result fulfills the typical performance requirements.

The initialization of ephemeris estimation process can be performed using the current broadcast ephemeris as a starting set for the ephemeris parameters to be estimated. However in the case broadcast ephemeris is unavailable, initialization can be performed using a previously calculated ephemeris. In addition, some of the GPS orbit model parameters change so rapidly in time that it is necessary to do the initialization by using propagated values of those ephemeris parameters. The propagation is based on the approximation of the time derivative of a parameter and on the time difference between the center of the fit window and the epoch of the initializing ephemeris.

In the noted embodiment, the synthetic ephemeris provides the navigation device software with a set of ephemeris that is similar in format to the broadcast ephemeris. Each synthetic ephemeris set is preferably valid for 4 hours. The accuracy of the calculated synthetic ephemeris is high and there is very low loss in accuracy compared to the predicted satellite positions. This causes the least amount of change in existing processing techniques and leads to minimal software modifications. However, the minimization estimation procedure is relatively complex to implement and adds a significant load if a low speed processor is used. Further, the least squares minimization is not guaranteed to find the global minimum of the objective function. The estimation procedure is based on finding the best ephemeris for 4 hours of predicted satellite positions. This makes it necessary for predictions to be performed at a minimum batch size of 4 hours.

In yet another embodiment of the disclosure, a third example of a suitable post-processing technique is satellite position to reduced ephemeris conversion. This implementation involves directly converting predicted satellite position and velocity vector data in the ECI coordinate system at a specific epoch into a reduced set of Keplerian orbital elements without the correction parameters. The reduced set of elements are composed of the six elements a, e, $i_0$, $\Omega_0$, $\omega$ and $M_0$. The set of equations to convert the inertial satellite position and velocity vector to the reduced set of elements is well known in the field of astrophysics.

As will be recognized, the predicted satellite positions spaced at 900 second intervals can thus be converted to reduced ephemeris sets at the same intervals. To maintain compatibility with broadcast ephemeris formats, the other parameters given above in Table 1 can be set to zero. Each reduced set can be used to determine satellite position for 900 seconds centered at the conversion epoch. The accuracy of the reduced set degrades quite rapidly with increasing time from the center epoch. With a prediction time step of 900 seconds, this method leads to 4 ephemeris sets per hour or 96 sets per day, for each satellite. Compared to the synthetic ephemeris approach described above, this method is simple to implement because it does not involve a complicated and time consuming minimization estimation process. The accuracy in the interval in which the reduced ephemeris is valid is comparable to that from the synthetic ephemeris. Further, no batch processing is necessary as each predicted satellite position vector can be directly converted to a set of ephemeris and used for a 900 second interval.

However, the noted embodiment does require an increase in storage capability since more ephemeris sets per satellite per day are generated. Further, a reduced ephemeris must be loaded every 900 seconds instead of 4 hours as compared to a conventional broadcast ephemeris or the calculated synthetic ephemeris discussed above.

In another aspect of the disclosure, it will be recognized that the satellite position prediction output includes a large set of satellite positions at several sample points over 3 to 5 days. As such, suitable modifications can be made to optimize the disclosed embodiments, including running predictions for each satellite for a preset amount of time, storing the resulting predictions in a database, table or buffer, storing the last states to resume processing when necessary and formatting the output using one of the methods discussed. In embodiments employing interpolation formatting, a suitable search scheme can be implemented to identify the interval in which the specified time lies, and extract the predicted positions and velocities at the endpoints of the interval from the stored location. Likewise, in embodiments using the synthetic ephemeris or reduced ephemeris methods, known techniques can be used to identify and access valid ephemeris sets that correspond to the specified time. Once the appropriate parameter set is chosen, it can be stored in memory or a temporary buffer and used until the end of its validity.

Given the proper formatting, as discussed above, the calculated ephemerides containing the satellite position predictions can be used by the navigation device to provide PVI information. Generally, in a GPS receiver navigation module, the receiver position is computed using an estimation procedure such as Least squares (LS) or Kalman filtering. The User Equivalent Range Error (UERE) for a given satellite is the statistical sum of the contributions from various error sources associated with the satellite and provides an indication of the pseudorange accuracy. The variance of the UERE is given by the sum of the variances of each contributing error source. If the UERE variance for each of the satellites used in the receiver position estimation algorithm is known a priori, it can be incorporated into the solution to get an improved estimate. The UERE estimate for a given satellite includes contributions from the ephemeris and clock errors. For the ephemerides calculated according to this specification, the UERE estimates for various ages of the predicted ephemeris can be determined offline using a large set of predicted data and stored in the navigation software in the form of a lookup table or otherwise. Based on the age of the satellite predictions being used in the estimation, the appropriate UERE value can be retrieved from the stored location.

Furthermore, the error in the predicted satellite positions can be broken into radial, along-track and cross-track components. If the statistical behavior of these error components is known, the expected errors or a derivative of those can be projected on the line-of-sight vector. These projections can be used for further weighting the measurements when calculating the user position estimate. The projection can be performed when an initial estimate of the user position is available.

In a further aspect of the disclosure, it may be desirable to check the quality of the satellite position predictions by computing a statistical metric based on the difference between satellite position predictions and old broadcast ephemeris or almanac based satellite positions at a specified time interval. For instance, at the end of the first day of predictions, the predictions from hours 22-24 spaced at T second intervals can be compared to the positions calculated using the broadcast ephemeris used to initialize the predictions or an almanac collected just before the predictions were calculated. The statistical metric so computed can be use in a statistical test to determine if the prediction quality meets pre-defined standards.

In one embodiment, the quality standard is set based on a suite of tests conducted off-line during the development of prediction routines in the laboratory. These tests provide thresholds for performance at the end of each day of prediction. Similar quality and integrity checks can be performed for satellite clock correction. If the predictions for a particular satellite fail the quality tests, predictions can be halted for that satellite and reinitialized when the next broadcast ephemeris becomes available. Besides these integrity checks, conventional receiver autonomous integrity monitoring (RAIM) algorithms can be used in the GPS receiver to identify and discard suspect satellite predictions. However, it is preferable to use detection thresholds in the RAIM that are modified to reflect the increased UERE based on the calculated ephemeris.

Another aspect of the disclosure involves integrating the calculated ephemerides with prior art server-based pseudo-ephemeris techniques. As discussed above, extended ephemeris GPS navigation strategies exist, wherein a dedicated server is used to generate a pseudo-ephemeris using Jet Propulsion Lab (JPL) predictions of GPS satellite positions and clock corrections. These pseudo-ephemerides can be combined with the calculated ephemerides when suitable.

In one example, the server generated pseudo-ephemeris can be compressed and written into a binary file that the user loads into a navigation device. Once loaded, the file can be used for as many days as the original JPL predictions were valid. In this example, the JPL prediction data and corresponding server-generated pseudo-ephemeris is valid for a 28-day period. As will be appreciated, the accuracy of the satellite position degrades with increasing age of the predictions, and can lead relatively larger user position errors.

However, when a more current broadcast ephemeris is received during the 28-day period, that data can be used to provide more accurate predictions for one or more satellites. In one instance, the clock correction parameters in the pseudo-ephemeris can be refreshed using the parameters included in the broadcast ephemeris. If only one set of broadcast ephemeris is available, the latest parameters can be used in place of the pseudo-ephemeris clock correction terms at all future times in the prediction time period. If more than one set of broadcast ephemeris is available, then it may be possible to curve fit or extrapolate the clock biases and obtain a clock correction curve that can be sampled at future instants.

Further, when the first broadcast ephemeris is available, satellite positions computed using the pseudo-ephemeris can be compared to positions computed using broadcast ephemeris at sampling points within the 4 hour validity period of the broadcast ephemeris. The statistical (mean, median, root-mean-square or other metrics) difference in the satellite positions can be simply compared to a pre-defined threshold or used with more complex hypothesis tests to determine if the quality of the pseudo-ephemeris meets expected standards. The threshold or hypothesis test conditions could be based on the age of the predictions, quality of service guarantees to the user and other factors.

When these first tests indicate that the quality of the pseudo-ephemeris is poor, the calculated ephemerides, using the latest broadcast ephemeris as a starting point, can supplant the server-generated ephemerides. For example, if the broadcast ephemeris is downloaded on day 20 of the 28-day predictions, the locally generated calculated ephemeris for 3 to 5 days starting at the end of broadcast ephemeris validity may be more accurate than the pseudo-ephemeris for the same days. If these first tests indicate the quality is acceptable, then the receiver can continue to use the pseudo-ephemeris until either the next broadcast ephemeris is available or the predictions reach the end of their validity. If another broadcast ephemeris becomes available during the course of the 28-day period, the test can be repeated to check if a calculated ephemeris is likely to be more accurate than the server-generated pseudo-ephemeris.

Similarly, a situation can exist when the pseudo-ephemeris based on JPL predictions having a given validity period has expired in the receiver and the user has not downloaded the latest binary file from the pseudo-ephemeris server. If the navigation device is further unable to download current broadcast ephemeris, the techniques disclosed in this specification can be used to provide a calculated ephemeris based upon the last available pseudo-ephemeris. This would help lengthen the period in which the receiver can continue to provide location estimates to the user under broadcast ephemeris deprived conditions.

In yet another aspect of the disclosure, the techniques used to generate a calculated ephemeris from a single or consecutive broadcast ephemerides can be extended to provide a more accurate calculation when two broadcast ephemerides are available and spaced exactly 24 hours apart. In this situation, the calculated ephemeris can be generated without performing the initial velocity calibration. The noted procedure corrects the linearly changing error in the argument of perigee $\omega$ and mean anomaly $M_0$ caused by using less accurate satellite velocity obtained from closed form equations. The output is a calculated ephemeris available at a frequency of 4 hours, having a format similar to broadcast ephemeris.

Figure 4:
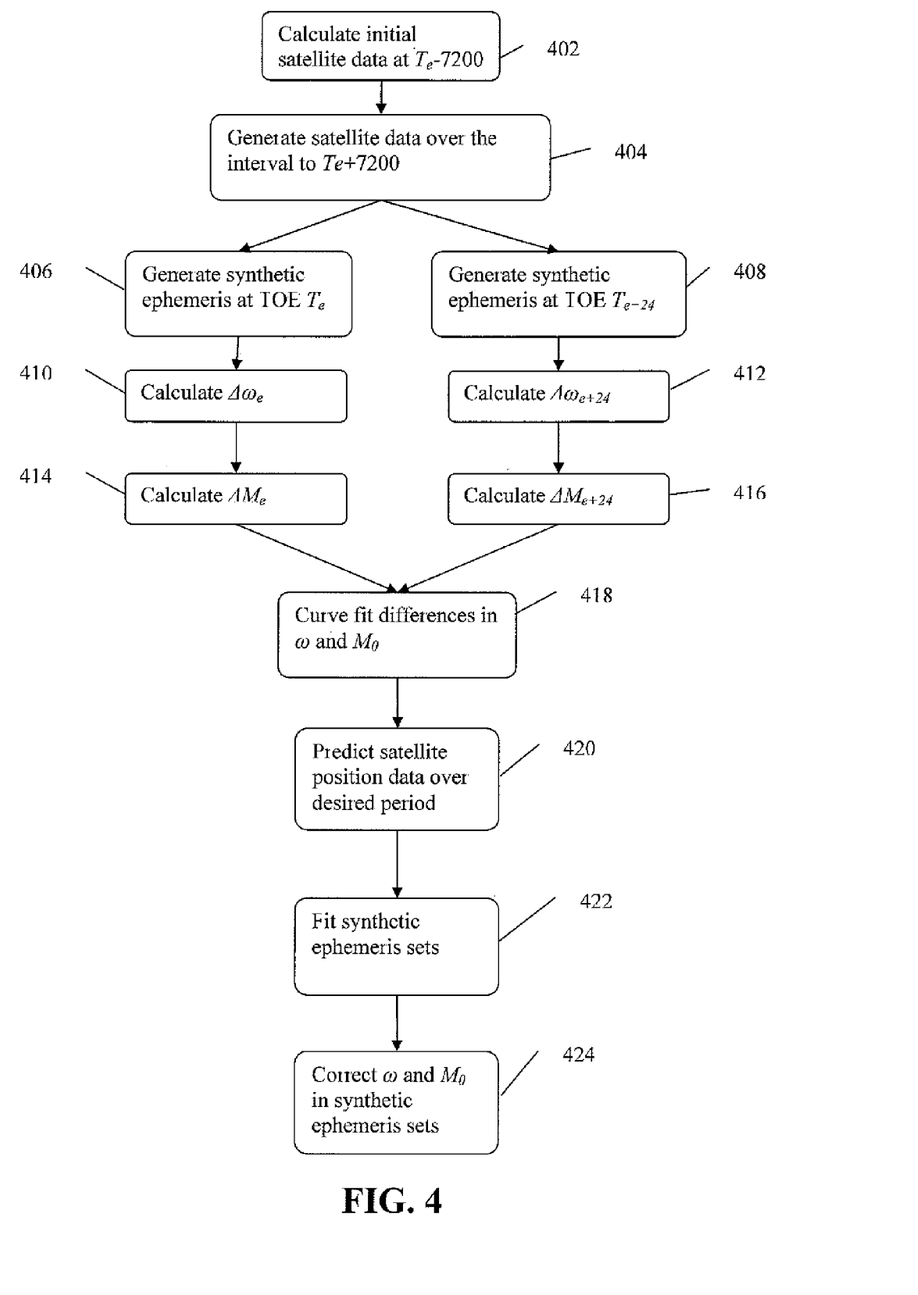
FIG. 4 is a flow chart showing the steps of an alternate procedure for predicting satellite velocity and position, according to an embodiment of the invention.

FIG. 4 outlines the steps of a procedure for utilizing data from two broadcast ephemerides at 24-hour intervals to generate a calculated ephemeris according to a further embodiment of the disclosure. In this situation, a first set of broadcast ephemeris has a TOE $T_e$ and is hence valid for the interval $[T_e-7200, T_e+7200]$. The second set of broadcast ephemeris has a TOE $T_{e+24}$ and is correspondingly valid for the interval $[T_{e+24}-7200, T_{e+24}+7200]$. In step 402, calculate the initial velocity and position at time $T_e-7200$ seconds using closed form equations in a manner similar to the procedures described above. Next in step 404, the available broadcast ephemeris data starting at time $T_e-7200$ are used to generate satellite position and velocity data every 900 seconds up to $T_{e+24}+7200$. In steps 406 and 408, respectively, using the satellite predictions in the intervals $[T_e-7200, T_e+7200]$ and $[T_{e+24}-7200, T_{e+24}+7200]$, convert the satellite position to a synthetic ephemeris to get a single set of predicted ephemeris with TOE $T_e$ and TOE $T_{e+24}$ in a manner similar to that described above. Next, in steps 410 and 412, respectively, calculate $\Delta\omega_e$ and $\Delta\omega_{e+24}$, the difference in the argument of perigee $\omega$ in the synthetic ephemeris and broadcast ephemeris at $T_e$ and $T_{e+24}$. Then, in steps 414 and 416, respectively, calculate $\Delta M_e$ and $\Delta M_{e+24}$, the difference in the mean anomaly $M_0$ in the synthetic ephemeris and broadcast ephemeris at $T_e$ and $T_{e+24}$. Next, in step 418, fit a linear function of time to curve fit the differences in $\omega$ and $M_0$. In step 420, starting at time $T_{e+24}+7200$, predict satellite position and velocity every 900 seconds up to $T_{e+24}+7200+N*86400$, where N is the number of days prediction is desired. In step 422, fit a synthetic ephemeris set to every 4 hours of non-overlapping satellite predicted positions. Finally, in step 424, correct the $\omega$ and $M_0$ values in the synthetic ephemeris sets by subtracting the corresponding values from the fitted correction curves.

In yet another aspect of the disclosure, when two or more consecutive broadcast ephemeris sets are available for a particular satellite, an alternate procedure for generating the calculated ephemeris can be employed to improve the predictions. This procedure also avoids the initial velocity calibration described above. When initialized with the position and velocity vector derived from closed-form equations, the predicted satellite positions have error components in the Radial, Along-track and Cross-track dimensions that increase with time in a regular manner. Thus, the noted alternate procedure first computes the error in the satellite positions in the Radial, Along-track and Cross-track dimensions between calculated predictions and broadcast ephemeris derived positions. Preferably, this can be done at regularly spaced times in the broadcast ephemeris validity interval. The error in each dimension is then curve fit using polynomial and/or trigonometric terms so that future satellite positions can be corrected to bring them closer to the true orbital positions. As one having skill in the art will appreciate, the patterns in the errors are more apparent when the observation period exceeds half the orbital period, making this technique suitable when two or more consecutive broadcast ephemeris sets are available.

Described herein are presently preferred embodiments, however, one skilled in the art that pertains to the present invention will understand that the principles of this disclosure can be extended easily with appropriate modifications to other applications. For example, the techniques of this specification can be adapted for other global navigation satellite systems including Galileo, GLONASS and Compass. As such, changes and modifications are properly, equitably, and intended to be, within the full range of equivalence of the following claims.

What is claimed is:

1. A method for determining a position of a device including a GPS receiver comprising the steps of:
   receiving with the GPS receiver a broadcast ephemeris having a validity period from a navigation satellite;
   calibrating an initial velocity for the satellite with the GPS receiver at a first time during the validity period by determining the satellite position at the first time using the broadcast ephemeris and by calculating positions for the satellite previous to the first time from the broadcast ephemeris;
   predicting a current satellite position subsequent to the end of the validity period with the GPS receiver on the basis of the calibrated initial velocity for the satellite;
   generating a calculated ephemeris with the GPS receiver from the predicted current satellite position; and
   determining the position of the device with the GPS receiver using the calculated ephemeris.

2. The method of claim 1, wherein the step of calibrating the initial velocity for the satellite comprises performing a non-linear estimation routine on the satellite position at the first time and the calculated previous satellite positions determined from the broadcast ephemeris.

3. The method of claim 2, wherein the step of calibrating the initial velocity for the satellite comprises the steps of:
   calculating an initial vector at the first time based upon the satellite position at the first time and the calculated previous satellite positions; and
   minimizing an objective function between the satellite position at the first time and the calculated previous satellite positions to estimate a new initial vector.

4. The method of claim 3, wherein the step of minimizing an objective function between the satellite position at the first time and the calculated previous satellite positions comprises minimizing the vector sum of a squared radial distance error by applying a Levenberg-Marquardt algorithm.

5. The method of claim 1, wherein the step of predicting a current satellite position subsequent to the end of the validity period comprises numerically integrating differential equations describing satellite motion.

6. The method of claim 5, wherein the differential equations comprise three velocity equations and three acceleration equations.

7. The method of claim 6, wherein the numerical integration is a Runge-Kutta method.

8. The method of claim 1, further comprising the step of calculating clock correction coefficients and wherein the step of generating the calculated ephemeris comprises generating the calculated ephemeris from the predicted current satellite position and the calculated clock correction coefficients.

9. The method of claim 8, wherein the step of calibrating the initial velocity for the satellite comprises performing a non-linear estimation routine on the satellite position at the first time and the calculated previous satellite positions determined from the broadcast ephemeris including the steps of:
   calculating an initial vector at a point during the validity period based upon the satellite position at the first time and the calculated previous satellite positions; and
   minimizing an objective function between the satellite position at the first time and the calculated previous satellite positions to estimate a new initial vector; and
   wherein the step of predicting a current satellite position subsequent to the end of the validity period comprises numerically integrating three differential velocity equations and three differential acceleration equations describing satellite motion.

10. The method of claim 8, wherein the predicted current satellite position occurs at a first time subsequent to the end of the validity period, further comprising the step of predicting a satellite position at a second time subsequent to the end of the validity period; wherein the step of generating the calculated ephemeris from the predicted current satellite position and the calculated clock correction coefficients comprises interpolating a satellite position between the first time and the second time subsequent to the end of the validity period.

11. The method of claim 10, wherein the step of interpolating a satellite position between the first time and the second time comprises a Hermite interpolation.

12. The method of claim 8, wherein the step of generating the calculated ephemeris from the predicted current satellite position and the calculated clock correction coefficients comprises estimating a set of osculating elements that have a form corresponding to the broadcast ephemeris.

13. The method of claim 8, wherein the step of generating the calculated ephemeris from the predicted current satellite position and the calculated clock correction coefficients comprises converting the predicted current satellite position into a reduced set of Keplerian orbital elements.

14. The method of claim 13, wherein the reduced set of Keplerian orbital elements has a form corresponding to the broadcast ephemeris.

15. A GPS receiver capable of determining a position based upon a received broadcast ephemeris having a validity period from a navigation satellite, wherein the GPS receiver comprises a processing unit having programming instructions configured to:
   provide an initial velocity calibration for the satellite at a first time during the validity period by determining the satellite position at the first time using the broadcast ephemeris and by calculating positions for the satellite previous to the first time from the broadcast ephemeris;
   predict a current satellite position subsequent to the end of the validity period on the basis of the calibrated initial velocity for the satellite;
   generate a calculated ephemeris from the predicted current satellite position; and determine the position of the receiver using the calculated ephemeris.

16. The receiver of claim 15, wherein the GPS receiver is configured to provide an initial velocity calibration for the satellite by performing a non-linear estimation routine on the satellite position at the first time and the calculated previous satellite positions determined from the broadcast ephemeris.

17. The receiver of claim 16, wherein the GPS receiver is configured to provide an initial velocity calibration by:
   calculating an initial at the first time based upon the satellite position at the first time and the calculated previous satellite positions; and
   minimizing an objective function between the satellite position at the first time and the calculated previous satellite positions to estimate a new initial vector.

18. The receiver of claim 17, wherein the receiver is configured to minimize the objective function by minimizing the vector sum of a squared radial distance error between the satellite position at the first time and the calculated previous satellite positions by applying a Levenberg-Marquardt algorithm.

19. The receiver of claim 15, wherein the GPS receiver is configured to predict a current satellite position subsequent to the end of the validity period by numerically integrating differential equations describing satellite motion.

20. The receiver of claim 19, wherein the differential equations comprise three velocity equations and three acceleration equations.

21. The receiver of claim 20, wherein the numerical integration is a Runge-Kutta method.

22. The receiver of claim 15, wherein the GPS receiver is configured to calculate clock correction coefficients and to generate the calculated ephemeris from the predicted current satellite position and the calculated clock correction coefficients.

23. The receiver of claim 22, wherein the GPS receiver is configured to calibrate the initial velocity for the satellite by performing a non-linear estimation routine on the satellite position at the first time and the calculated previous satellite positions determined from the broadcast ephemeris and predict the current satellite by numerically integrating three differential velocity equations and three differential acceleration equations describing satellite motion.

24. The receiver of claim 22, wherein the predicted current satellite position occurs at a first time subsequent to the end of the validity period, wherein the GPS receiver is further configured to predict a satellite position at a second time subsequent to the end of the validity period and wherein the GPS receiver is configured to generate the calculated ephemeris by interpolating a satellite position between the first time and the second time subsequent to the end of the validity period.

25. The receiver of claim 24, wherein the GPS receiver is configured to generate the calculated ephemeris by interpolating the satellite position using Hermite interpolation.

26. The receiver of claim 22, wherein the GPS receiver is configured to generate the calculated ephemeris by estimating a set of osculating elements that have a form corresponding to the broadcast ephemeris.

27. The receiver of claim 22, wherein the GPS receiver is configured to generate the calculated ephemeris by converting the predicted satellite position into a reduced set of Keplerian orbital elements.

28. The receiver of claim 27, wherein the reduced set of Keplerian orbital elements has a form corresponding to the broadcast ephemeris.

* * * * *